United States Patent Office 3,561,204
Patented Feb. 9, 1971

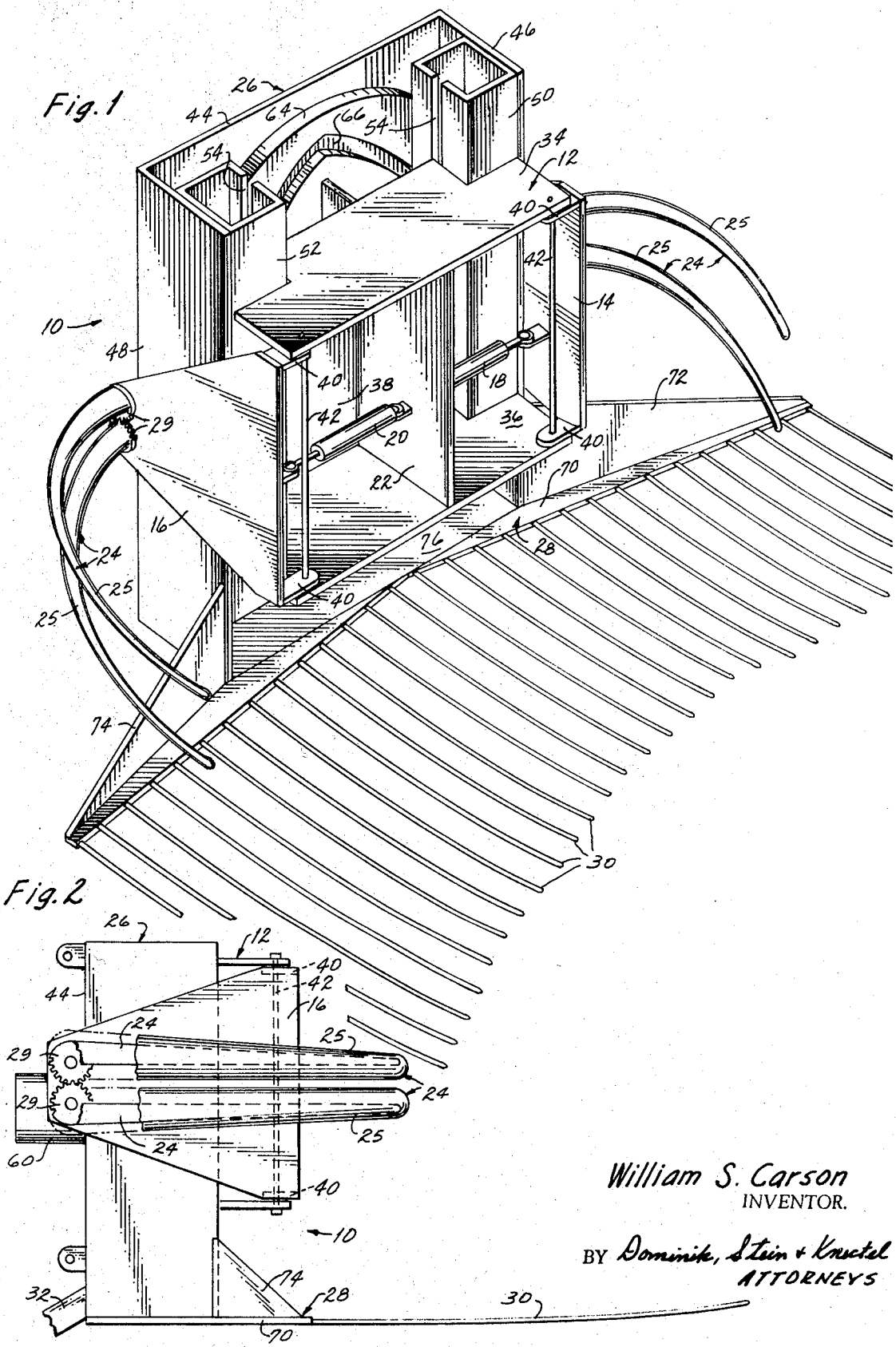

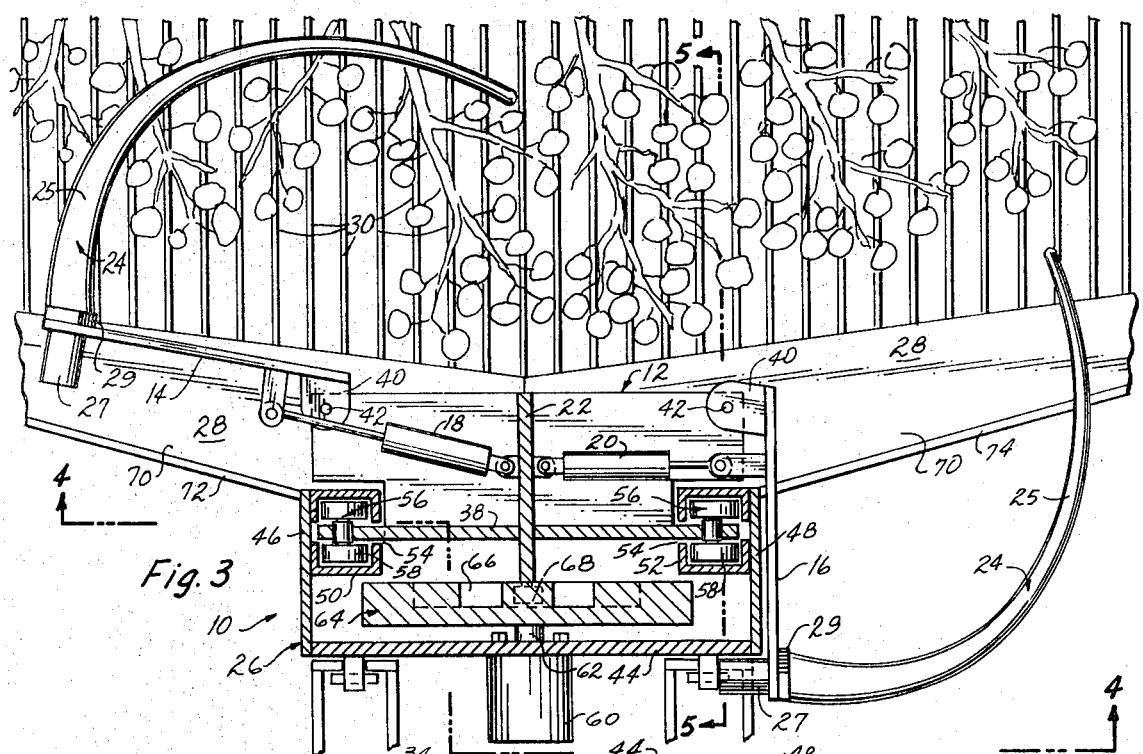

3,561,204
FRUIT PICKER
William S. Carson, Highland Park, Lake Wales, Fla., assignor of forty percent to Ashland Company of New Jersey, Inc., Newfoundland, N.J.
Filed June 20, 1967, Ser. No. 647,524
Int. Cl. A01g *19/00*
U.S. Cl. 56—328                                8 Claims

ABSTRACT OF THE DISCLOSURE

A shaker for harvesting fruit from a tree which includes, generally, prongs for engaging the fruit-bearing foilage of a tree. The prongs are moved with a snap-motion to cause ripened fruit to drop. A fruit catcher may be affixed to the shaker.

---

This invention relates, in general, to harvesting apparatus and, in particular, to a shaker for harvesting fruit from a tree.

There are numerous shaker type fruit pickers presently available. Some shakers are adapted to shake the main trunk, such as seen in U.S. 1,626,608. Some merely shake the limb, such as seen in: U.S. 1,472,262; U.S. 2,159,311; and U.S. 3,101,583. And some directly "knock" the fruit from the tree, such as seen in: U.S. 2,867,964; and U.S. 2,925,687.

All such shakers cause considerable damage to the tree, the limbs and the fruit. The trunk type seem to shock the tree, adversely affecting future growth and fruit production. The limb type, when they must be firmly engaged with or affixed to the limb, or when they merely pound against the limb, cause bruising and occasional breaking of the limb. The knocker type, likewise bruise and break the limbs.

With respect to the shaker structure itself, if must be relatively heavy and sturdy, and have heavy-duty drive means, due simply to the fact that a heavy operation requires such to operate it. For the same reason, the shaker is subject to considerable wear. Accordingly, considerable maintenance is required, which maintenance is costly both from the standpoint of parts and labor and from the necessary downtime to repair the apparatus.

An object of the present invention is to provide an improved shaker of unique action for harvesting fruit from a tree.

Another object is to provide a shaker of the above characteristics which will not damage the tree, its limbs or its fruit.

Still another object is to provide a shaker of the above characteristics which is simple in structure, with only a few moving parts so that little maintenance is required.

A further object is to provide a shaker of the above characteristics which functions to shake the fruit-bearing foliage of a tree to remove the fruit, without vibrating the limbs to any extent.

A still further object is to provide a shaker, of the above characteristic, which is easily transported and manipulated to harvest fruit.

Other objects of the invention will in part be obvious and will in part appear hereinafter.

The above objectives are accomplished with a novel acting shaker which includes, generally, prongs movable to engage the fruit bearing foliage of a tree. The prongs are then moved via the structure employed to provide movement to the fruit-bearing foliage in a direction followed by a quick reversal in movement whereby the fruit is "snapped" loose and caused to drop. If desired, a catcher may be affixed to the shaker to catch the fruit as it drops.

More particularly, the novel acting shaker of this invention comprises prongs, preferably covered with rubber or other protective material, which insert into and preferably clamp the foliage of the fruit tree. The prongs are then moved, in unison, by reason of their common support means, in opposite directions, with quick reversal of movement between each direction whereby a snap-action is imparted. In essence, a short "snap-the-whip" movement is attained on the foliage. This causes the ripened fruit to drop, preferably into a catcher associated with the common support means, or by reason of a funnel-like arrangement of the prongs.

The support means is moved preferably via a cam mechanism, which automatically changes the speed of the shaker head to impart a snap-to-whip, although other mechanisms which impart a snap motion, such as a cycling hydraulic piston, an eccentric shaft mechanism, or the like could be used. The support means are vertically positionable with respect to the tree by reason of its incorporation in a vertical lift or boom.

The invention accordingly comprises the features of construction, combination of elements, and arrangement of parts and the several steps and the relation of one or more of such steps with respect to each of the others thereof, which will be exemplified in the construction and method hereinafter set forth, and the scope of the invention will be indicated in the claims.

For a fuller understanding of the nature and objects of the invention, reference should be had to the following detailed description taken in connection with the accompanying drawings in which:

FIG. 1 is a perspective view of a shaker exemplary of the invention;

FIG. 2 is a side view of the shaker;

FIG. 3 is a top cross sectional view taken on line 3—3 of FIG. 2;

FIG. 4 is a rear cross sectional view, taken along line 4—4 of FIG. 3 to illustrate the cam drive of the shaker; and FIG. 5 is a side cross sectional view, taken along line 5—5 of FIG. 4.

Similar reference characters refer to similar parts throughout the several views of the drawings.

Referring now to the drawings, there is shown a shaker 10 including a shaker head 12 which has generally triangular-shaped prong-support plates 14 and 16 hingedly and pivotally affixed to it so as to be foldable against the opposite sides of the shaker 10, as illustrated in FIG. 1. A pair of hydraulic cylinders 18 and 20 are affixed to respective ones of the prong-support plates 14 and 16 and to a center plate 22 within the shaker head 12, and are operable to pivotally swing the prong-support plates outward to a position substantially perpendicular to the sides of the shaker 10, as illustrated in FIG. 3. A number (two in the device) of curved or arcuate-shaped prongs 24 are affixed to each of the prong-support plates 14 and 16 and, when the prong-support plates are moved to the extended position shown in FIG. 3, these prongs 24 are extended into the fruit-bearing foliage of a tree. In the preferred version, the prongs are pivoted via hydraulic motor 27 and gears 29 to clamp the foliage. Alternately, they may be opened even further than that shown in FIG. 1, to increase functional contact with the foliage. Or they may be made self-expandable through an internal mechanism or pneumatic expansion means to effect a "grip" on the foliage.

The prongs 24 are preferably covered with rubber 25, or sponge to prevent undue damage to the foliage.

The shaker head 12 is affixed with a U-shaped frame 26, so as to be slidably moved up and down with respect to the frame, to shake or vibrate the fruit-bearing foliage to cause the fruit thereon to drop. A comblike catcher 28 having a number of tines 30 is affixed to the frame 26 so as to extend beneath the prongs 24 to catch the fruit which is shaken from the tree. Alternatively, where a number of prongs are used, these may be arranged in funnel fashion to funnel the severed fruit downwardly to the catcher 28. In such instance, a lesser number or complete elimination of the outer tines 30 is possible.

The catcher 28 is adapted to cause the fruit to roll toward the rear center portion thereof, and a tube-type conveyor 32 can be affixed to the catcher 28 at this point, for conveying the fruit to a loading or storage station, as illustrated in FIG. 5.

The shaker 10 preferably is affixed to a vertical lift or to the end of an extendable boom (not shown) which is operable to manipulate the shaker to position it adjacent a tree whereby the prongs 24 can be extended into the fruit-bearing foliage of the tree. The lift or boom also is preferably affixed to a vehicle (not shown) for transporting it from one tree to another.

More specifically, the shaker 10 has a shaker head 12 which is generally of a T-shaped boxlike construction having a top wall 34, a bottom wall 36, a back wall 38 (best seen in FIG. 3) and a center plate 22. The prong-support plates 14 and 16 each have a pair of pivot flanges 40 affixed to them which are pivotally affixed to the top wall 34 and the bottom wall 36 by means of pivot rods 42. The prong-support plates 14 and 16 normally are adapted to be positioned along the opposite sides of the shaker 10, and have the hydraulic cylinders 18 and 20 affixed to respective ones of them and to the center plate 22. The hydraulic cylinders 18 and 20 are operable to pivotally swing the prong-support plates 14 and 16 through an angle of approximately 90°, to position one or both of them in substantially the same vertical plane of the front of the shaker head 12, as illustrated in FIG. 3. The prongs 24 affixed to the prong-support plates 14 and 16 are, in this fashion, extendable into the foliage of a tree.

The U-shaped frame 26 of the shaker 10 is substantially the same width as the shaker head 12 but is longer in length so that the shaker head 12 can be slidably moved up and down within the frame, in the manner described below. The frame 26 has a back wall 44 and two side walls 46 and 48. A tubular guide 50 and 52, each of which has a guide slot 54 extending along the length of one side wall thereof, is affixed to respective ones of the side wall 46 and 48, with the guide slots 54 aligned in face-to-face relationship. As can be best seen in FIG. 3, the back wall 38 of the shaker is of a width so that its two side edges extend through the guide slots 54 into the interior of the guides 50 and 52. A pair of rollers 56, (FIGS. 3 and 5), each of which has two roller wheels 58, are retained within each of the guides 50 and 52 and are affixed to the side edges of the back wall 38, near the top and bottom thereof, so as to guidingly and rollingly support the shaker head 12 within the frame 26.

A hydraulic motor 60 having an output shaft 62 is fixedly secured to the back wall 44 of the frame 26. Its output shaft extends through the back wall 44 and has a cam 64 affixed to it. The cam 64 has a generally heart-shaped cam track 66 formed in it to which a cam follower 68 is drivingly engaged. The cam follower 68 is affixed to an extension of the center plate 22 within the shaker head 12, as best seen in FIG. 3. The hydraulic motor 60 rotatably drives the cam 64 and, as the cam 64 rotates, the cam follower 68 follows the cam track 66. It can be seen that the shaker head 12 is thereby raised and lowered with respect to the frame 26, and in an upwardly or downwardly movement followed by a quick reversal of movement whereby a snap-action is imparted. When raised and lowered in this fashion, the prongs 24 cause the fruit-bearing foliage of the tree to be snapped like a whip to cause the fruit to drop free of the foliage. With such an arrangement, very little actual vibration of the limbs occurs, as the shaking action is applied directly to the fruit, rather than to and through the limbs. Very little damage, if any, to the tree limbs, the foliage or the fruit occurs.

In the embodiment shown in FIG. 1, the catcher 28 is affixed to the frame 26 of the shaker 10. It has a base 70 which is generally wing-shaped so as to span outwardly a considerable distance on each of the front sides of the shaker. A number of tines 30 are affixed to the base 70, so as to extend into the foliage of a tree when the shaker 10 is positioned adjacent to it. The tines 30 are advantageously disposed at a slight angle so as to cause the fruit which drops onto them to roll toward the shaker frame 26. A pair of guide rails 72 and 74 are affixed to the base 70, to guide the fruit centrally toward an open collecting area 76 formed beneath the shaker head 12, by the side walls 46 and 48 of the frame. As illustrated in FIG. 5, a tube-type conveyor 32 can be affixed to the back wall 44 of the frame, for conveying the fruit to another station.

The operation of the shaker 10 is apparent from the above description. As indicated, the shaker 10 preferably is affixed to the end of a movable boom so that it may be positioned adjacent a tree, with the tines 30 of the catcher 28 extending into the foliage of the tree. One or both of the hydraulic cylinders 18 and 20 next is operated to pivotally swing the prong-support plates 14 and 16, to extend the prongs 24 affixed to them into the foliage. The foliage is then preferably clamped between the prongs 24 by operation of hydraulic motor 27 and gears 29 at the root of each prong. Hydraulic motor 60 then rotates the cam 64 which action, as explained above, causes the shaker head 12 to impart a to-and-fro movement (or) opposed movement with a snap-action between each movement to the fruit-bearing foliage. The ripened fruit which drops free of the foliage is caught by the tines 30 of the catcher 28 and from the catcher 28 can be conveyed to a subsequent station by the conveyor 32. The prongs 24, after harvesting are then opened and retracted, and the shaker 10 repositioned to harvest other fruit from a different section of the same or another tree.

It is apparent from the description that the shaker 10 is of relatively simple construction and further that it does not require the large source of power which most presently available shakers which physically shake the limbs or the tree trunks require. For the same reasons, it may be much lighter in weight and is therefore more easily maneuverable. Since heavy strain is avoided, it is subjected to considerably less damage or wear.

The source of hydraulic power (not shown) for the shaker 10 preferably is mounted upon and controlled from the vehicle used to transport the shaker 10. In this way, one man can easily manipulate and operate the shaker to harvest the fruit from the tree or trees. The source of hydraulic power can be of conventional design, having control valves (not shown) for controlling the operation of the hydraulic cylinders 18 and 20 and the hydraulic motor 60.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. A device for harvesting produce from a tree or bush comprising
   a frame member;

a shaker member carried by said frame member;
a plurality of arms in operative engagement with said shaker member for engaging portions of said tree or bush,
at least one pair of arms being movable relative to each other and adapted when inserted into the tree or bush to clamp the foliage or secondary branches disposed therebetween; and
means in operative engagement with said shaker member to impart substantially vertical oscillatory movement to said shaker member and said plurality of arms whereby said produce drops from said tree or bush for harvesting.

2. The invention as defined in claim 1 having, in addition, catcher means for catching the produce harvested from said tree or bush.

3. The invention as defined in claim 1 wherein the substantially vertical oscillatory movement is imparted by drive means which effect a directional change during the movement of the shaker member.

4. The invention as defined in claim 3 wherein said drive means comprises a hydraulic motor and a source of hydraulic power to operate said motor.

5. The invention as defined in claim 1 including a movable carrier for said device.

6. A shaker for harvesting produce from a tree or bush comprising, in combination,
a frame member;
a shaker member carried by said frame member and adapted to be moved with a snap motion;
foliage or secondary branch engaging means carried by said shaker member for engaging the foliage or secondary branches of said tree or bush;
means in operative engagement with said shaker member to impart said snap motion to said foliage or secondary branch engaging means to harvest the produce from said foliage; and
means to cause clamping of the foliage or secondary branches by said foliage engaging means.

7. The invention as defined is claim 6 including means to open said foliage or secondary branch engaging means after they have been inserted into said foliage or secondary branches.

8. The shaker of claim 6 wherein said means to impart a snap motion to said foliage engaging means comprises drive means and oscillatory means driven by said drive means to effect said snap motion.

References Cited

UNITED STATES PATENTS

| | | | |
|---|---|---|---|
| 1,472,262 | 10/1923 | Abildgaard | 56—328 |
| 1,626,068 | 4/1927 | Bartlett | 56—328 |
| 3,347,587 | 10/1967 | Frost | 56—328X |
| 3,405,515 | 10/1968 | Dittmer | 56—328 |
| 3,413,789 | 12/1968 | Studer | 56—330 |
| 3,184,908 | 5/1965 | Rust | 56—330 |
| 3,203,159 | 8/1965 | Weygandt et al. | 56—1 |
| 3,396,521 | 8/1968 | McKibben et al. | 56—330 |
| 3,439,482 | 4/1969 | Orton | 56—330 |

RUSSELL R. KINSEY, Primary Examiner